(12) United States Patent
Yu et al.

(10) Patent No.: US 7,233,499 B2
(45) Date of Patent: Jun. 19, 2007

(54) EXTENDED MEMORY CARD

(75) Inventors: Gordon Yu, Taipei (TW); Ming-Che Chang, Tainan (TW); Chien-Wei Teng, Miaoli (TW); Ching-Lung Wu, Baihe Township, Tainan County (TW)

(73) Assignee: C-One Technology Corporation (TW)

( * ) Notice: Subject to any disclaimer, the term of this patent is extended or adjusted under 35 U.S.C. 154(b) by 0 days.

(21) Appl. No.: 11/152,231

(22) Filed: Jun. 15, 2005

(65) Prior Publication Data
US 2006/0025020 A1    Feb. 2, 2006

(30) Foreign Application Priority Data
Jul. 28, 2004    (TW) .............................. 93122555 A

(51) Int. Cl.
*H05K 7/10* (2006.01)
(52) U.S. Cl. ...................... 361/737; 439/946; 235/492; 235/441; 257/679
(58) Field of Classification Search ............... 361/737, 361/736, 752; 235/492, 441, 487; 439/76.1, 439/945, 946; 257/679
See application file for complete search history.

(56) References Cited
U.S. PATENT DOCUMENTS

| | | | |
|---|---|---|---|
| 6,858,086 B2* | 2/2005 | Kang ......................... 118/720 |
| 6,858,925 B2* | 2/2005 | Wada et al. ................. 257/679 |
| 6,865,086 B2* | 3/2005 | Gochnour et al. .......... 361/737 |
| 6,944,028 B1* | 9/2005 | Yu et al. ..................... 361/737 |
| 6,945,465 B2* | 9/2005 | Nishizawa et al. ......... 235/492 |
| 6,970,359 B2* | 11/2005 | Gochnour et al. .......... 361/737 |
| 7,025,623 B2* | 4/2006 | Katsumata et al. ......... 439/483 |
| 2002/0116668 A1* | 8/2002 | Chhor et al. .................. 714/42 |
| 2004/0070952 A1* | 4/2004 | Higuchi et al. ............. 361/737 |
| 2005/0086413 A1* | 4/2005 | Lee et al. .................... 710/313 |

\* cited by examiner

*Primary Examiner*—Tuan Dinh
*Assistant Examiner*—Dameon E. Levi
(74) *Attorney, Agent, or Firm*—Bacon & Thomas PLLC

(57) ABSTRACT

An extended memory card capable of coupling to a reduced size memory card and having an electrical connection to a card reader is disclosed. The extended memory card comprises a first flash memory and a first client controller, where the card reader accesses to the first flash memory by controlling the operation of the first client controller. The reduced size memory card further comprises a second flash memory and a second client controller, where a host controller accesses to the second flash memory by controlling the operation of the second client controller. The extended memory card coupled to the reduced size memory card has the same size as an MMC card. The reduced size memory card has the same size as the RS-MMC card.

6 Claims, 3 Drawing Sheets

EXTENDED MEMORY CARD

BACKGROUND OF THE INVENTION

1. Field of the Invention

The present invention relates to a memory card and, more particularly, to an extended memory card.

2. Description of the Related Art

Memory cards are usually used as a storage medium for portable electronic devices such as digital cameras and multimedia players. There are several kind of memory cards currently available on the market, for instance, the Secured Digital (SD) card, the Memory Stick (MS), the Multimedia card (MMC), the Compact Flash (CF) card and so on. Although these memory cards vary in respect of the electrical specifications and physical sizes thereof, all of them are featured by high storage capacity and low power consumption. Also, the reduced size memory card was developed from the foregoing memory cards as advanced with the development of technology and miniaturization of portable electronic devices. For example, the MMC card was miniaturized to become the reduced size (RS) MMC card, and the MS card was miniaturized to become the MS Duo card.

Many portable electronic devices are designed to provide either a mini slot into which the user can insert the reduced size memory card, or a standard slot for receiving the memory card. Referring to FIGS. 1 and 2, when a conventional RS-MMC card 12 is inserted into a portable electronic device with the mini slot, the conventional RS-MMC card 12 operates normally. However, if the user wants to insert the conventional RS-MMC card 12 into a portable electronic device with a standard slot, the user has to connect the conventional RS-MMC card 12 with an extended card 14 because the RS-MMC card is smaller in physical size than the MMC card 10. The physical size of the combination of the extended card 14 and the conventional RS-MMC card 12 is therefore equivalent to that of the MMC card 10 to operate normally in the portable electronic device. The extended card 14 is merely an adapter design without any additional function. The inventor of the present invention thus provides an extended card having improvements over the function of the extended card 14.

SUMMARY OF THE INVENTION

To improve the memory capacity of the RS-MMC card, the present invention discloses an extended memory card capable of coupling to a reduced size memory card and having an electrical port for connection to a card reader, the card reader is preferably deposited in a portable electrical device. The extended memory card comprises a first flash memory and a first client controller, and therefore the card reader can access the first flash memory by controlling the operation of the first client controller. The reduced size memory card comprises a second flash memory and a second client controller, and therefore the host controller can access the second flash memory by controlling the operation of the second client controller. The reduced size memory card and the RS-MMC card are preferably of the same physical size, and the combined extended memory card and reduced size memory card are preferably the same as the MMC card in physical size.

Because the host controller of the card reader is capable of recognizing the client controller, the extended memory card of the present invention can be coupled to the reduced size memory card of the present invention to provide the storage capacity of the entire memory card.

Additional features and advantages of the present invention will be set forth in part in the description which follows, and in part will be obvious from the description, or may be learned by practice of the present invention. The features and advantages of the present invention will be realized and attained by means of the elements and combinations particularly pointed out in the henceforth appended claims.

The accompanying drawings, which are incorporated in and constitute a part of this specification, illustrate several embodiments of the present invention and together with the description, serve to explain the principles of the present invention.

DESCRIPTION OF THE EMBODIMENTS

Reference will now be made in detail to present embodiments of the present invention, examples of which are illustrated in the accompanying drawings. Wherever possible, the same reference numbers will be used throughout the drawings to refer to the same or like parts.

Figure 1:
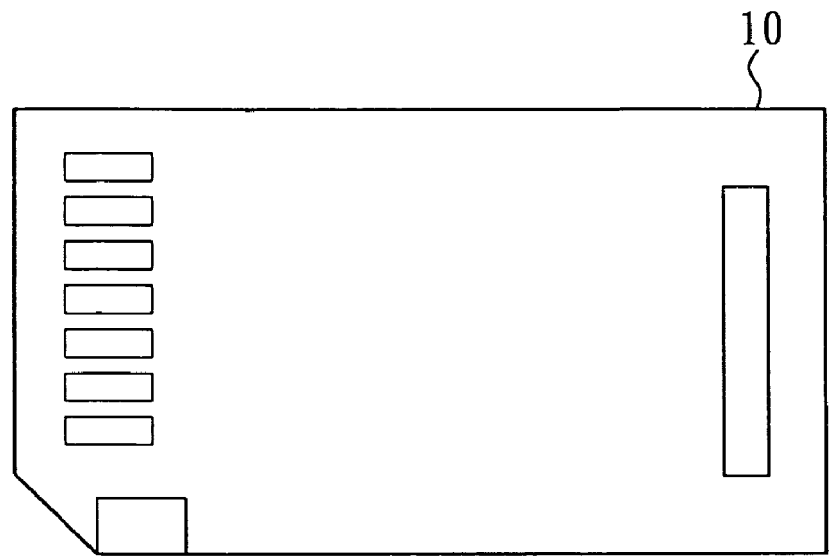
FIG. 1 illustrates schematic views of a conventional MMC card.
Figure 2:
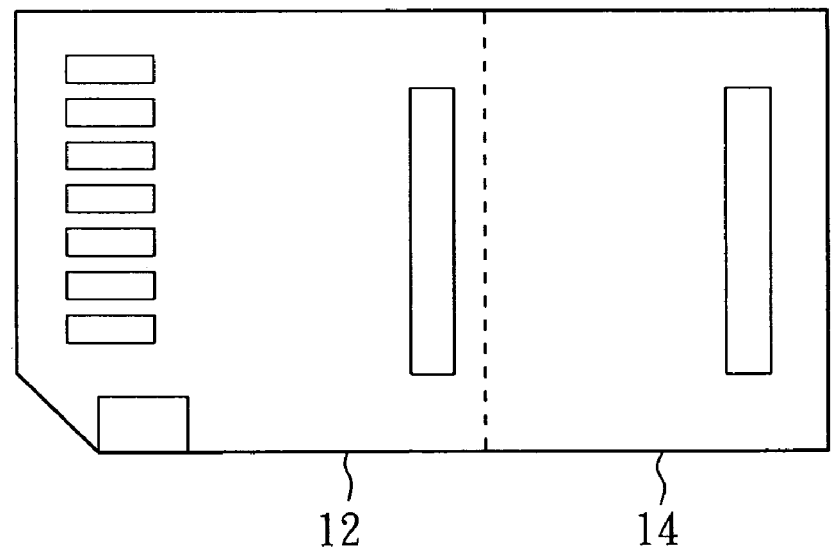
FIG. 2 illustrates schematic views of a conventional RS-MMC card and an extended card.
Figure 3:
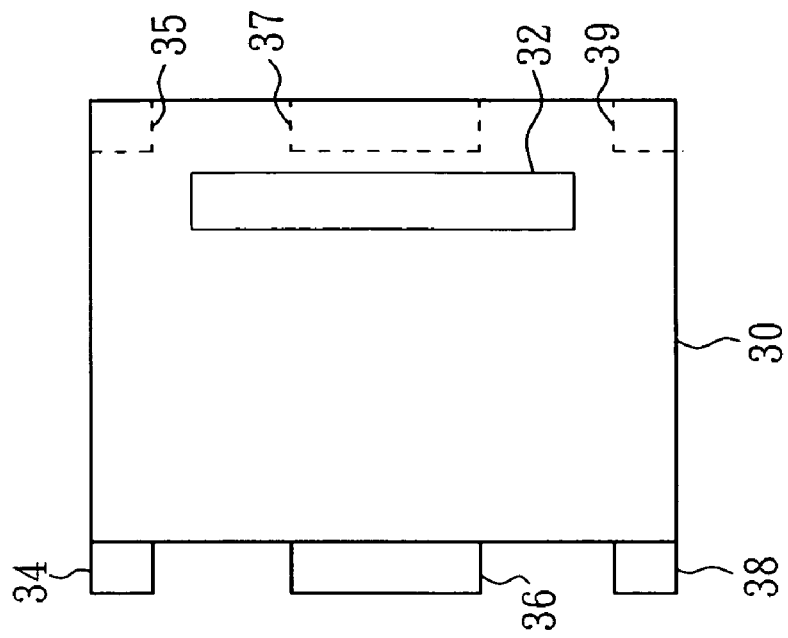
FIG. 3 illustrates schematic views of an extended memory card and an extensible reduced size memory card in accordance with the present invention.
Figure 3:
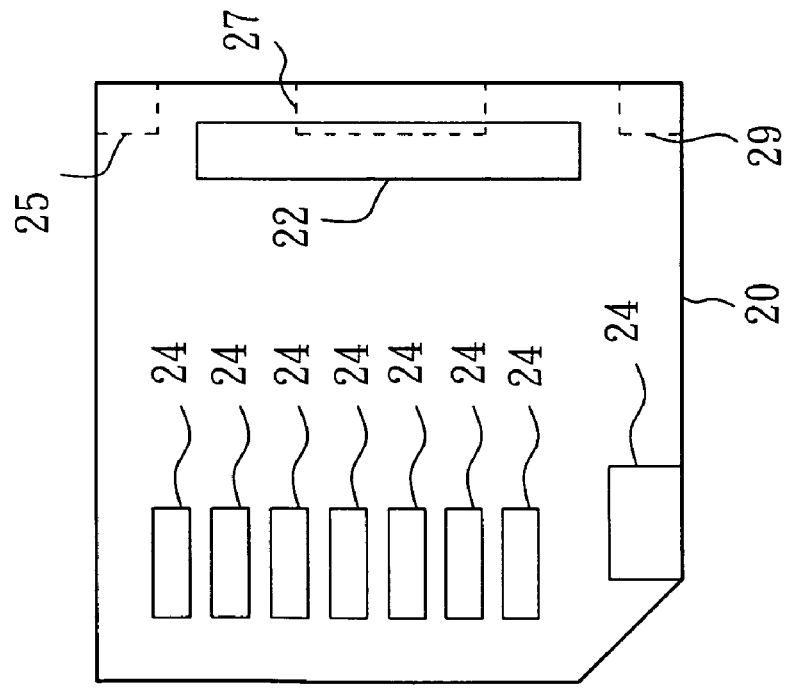
Figure 4:
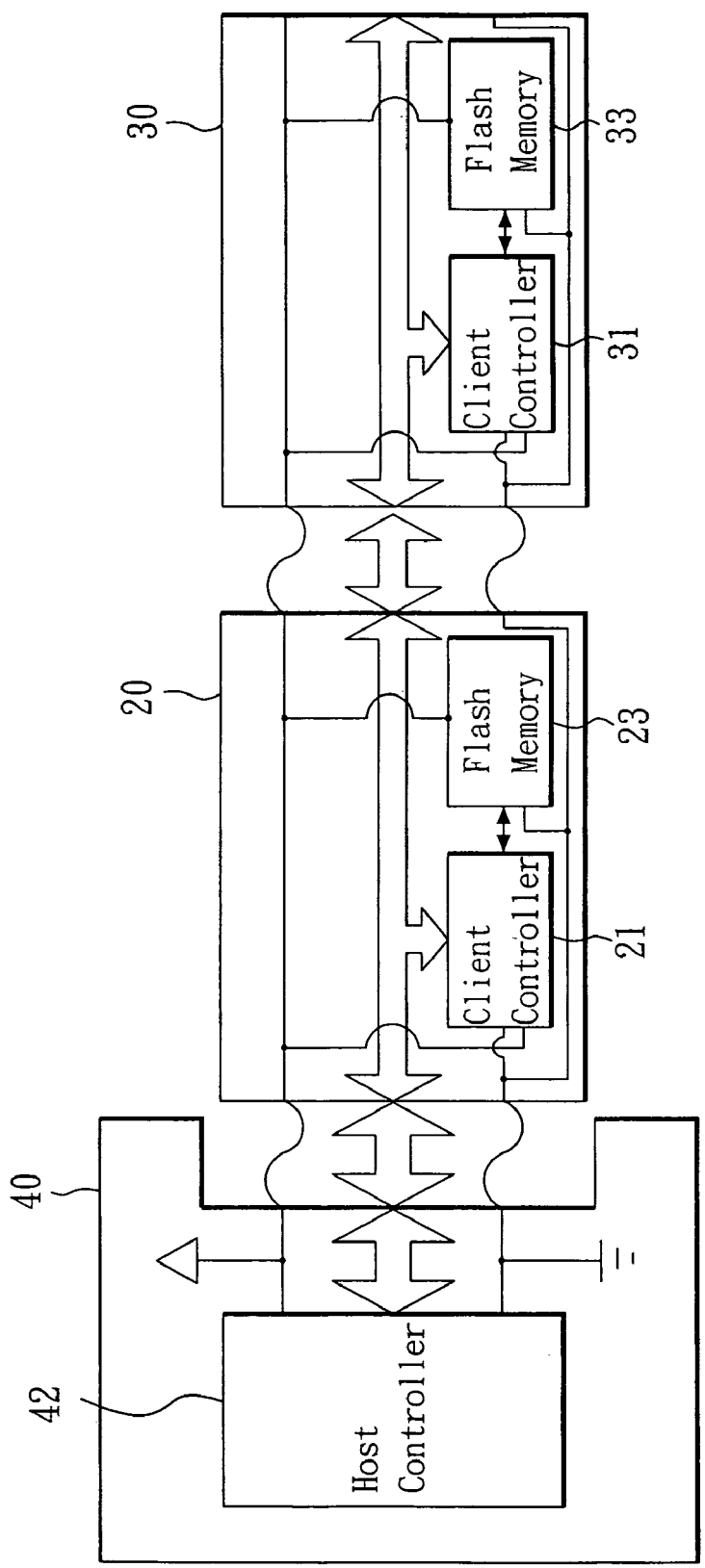
FIG. 4 illustrates functional block diagrams of an extended memory card and an extensible reduced size memory card in accordance with the present invention.

Referring now to FIG. 3, the reduced size memory card 20 in accordance with the present invention has the same electronic specifications and the same size as the conventional RS-MMC card 12. Several metal pads 24 are provided at one end of the housing of the reduced size memory card 20 in the same way as the conventional RS-MMC card 12. The reduced size memory card 20 is capable of being inserted into a portable electrical device with a mini slot. Similarly, a notch 22 is also defined over the upper surface of the housing of the reduced size memory card 20 so as to provide a user with better control of plug in/out. The reduced size memory card 20 is further different from the conventional RS-MMC card 12 in having more notches 25, 27 and 29 to connect to protrusions 34, 36 and 38 respectively.

The extended memory card 30 in accordance with the present invention can be mechanically and electrically coupled to the reduced size memory card 20, having at least one connection such as protrusions 34, 36 and 38 at one end of the housing thereof to engage with or couple to the notches 25, 27 and 29 respectively. A notch 32 is defined over the upper surface of the housing to provide the user with better control of plug in/out. When the extended memory card 30 couples to the extensible reduced size memory card 20, the combinative physical size of the extended memory card 30 and the reduced size memory card 20 is equivalent to the size of the MMC card 10. The notches 25, 27 and 29 have metal lines at the inner edge and the protrusions 34, 36 and 38 have metal lines at the outer edge thereof, therefore the extended memory card 30 can be electrically coupled to the reduced size memory card 20 by connecting the notches 25, 27 and 29 to the protrusions 34, 36 and 38 respectively. For example, the notch 25 and the protrusion 34 are defined as ground (GND), the notch 29 and the protrusion 38 are defined as system power (VCC), and the notch 27 and the protrusion 36 are defined as data, including clock (CLK) and command (CMD). As such, the power is supplied to the extended memory card 30 by means of the notch 29 and the protrusion 38. Data are transmitted to the extended memory card 30 by means of the notch 27 and the protrusion 36. A ground signal is provided to the extended memory card 30 by means of the notch 25 and the protrusion 34. In addition, notches 35, 37 and 39 are defined in the other end of the extended memory card 30, being designed identical to the notches 25, 27 and 29 for connecting to a possible further extended memory card.

Referring to FIG. 3, after the extended memory card 30 is coupled to the extensible reduced size memory card 20, the entire memory card is then inserted into a card reader 40 of the portable electrical device. Because the reduced size memory card 20 electrically connects to the card reader 40, the host controller 42 is capable of outputting data and control signal to the client controllers 21, 31 respectively, and also power signal and grounding signal to the client controllers 21, 31 and the flash memories 23, 33. When detecting the existence of the client controller 21 or 31, the host controller 42 requests the client controller 21 or 31 to register. After the client controller 21 or 31 completes the registration procedure, the host controller 42 assigns an identification (ID) code to the client controller 21 or 31. Hence, the host controller 42 controls the operation of the client controller 21 or 31 based on the ID code to indirectly access data stored in the flash memories 23 and 33, It is well-known that the ID code of each client controller would not be the same, therefore the host controller 42 can distinguish the flash memory 23 from the flash memory 33 correctly. The host controller 42 identifies the entire memory card as a first memory card and a second memory card, or alternatively as a single memory card with a summed storage capacity. The afore aspects of the flash memories are subject to the host controller 42, being not specifically defined as one of the two the manners to avoid a setting problem in usage.

Taking a communication protocol having one-bit data as an example, the protrusion 36 has three metal lines at the outer edge thereof, the three metal lines including one data line, one clock line and one control line. Likewise, in the case of a communication protocol having four-bit or eight-bit data, the protrusion 36 requires six or ten metal lines at the outer edge thereof, where the metal lines include four or eight data lines, one clock line and one control line.

The extended memory card 30 is not merely a design of mechanism, but also has the client controller 31 and the flash memory 33 therein. After the extended memory card 30 couples to the reduced size memory card 20, the memory capacity is increased to achieve the object of expanding the memory capacity of the reduced size memory card 20.

Other embodiments of the present invention will be apparent to those skilled in the art from consideration of the specification and practice of the present invention disclosed herein. It is intended that the specification and examples be considered as exemplary only, with a true scope and spirit of the present invention being indicated by the following claims.

What is claimed is:

1. An extended memory card capable of coupling to a reduced size memory card, the reduced size memory card having plural metal pads provided at one side of a housing for insertion into a card reader, and plural first notches having metal lines at the other side, the extended memory card comprising:
   a flash memory;
   a client controller; and
   plural protrusions having metal lines configured to correspond to and couple to the first notches of the reduced size memory card by electrically connecting the first notches to the protrusions respectively;
   plural second notches defined in a side opposite to the plural protrusions, the plural second notches being configured identically to the first notches for connecting another extended memory card;
   wherein the reduced size memory card and the extended memory card coupled to the reduced size memory card have a size equivalent to that of a standard memory card, and the card reader communicates with the client controller to indirectly access the flash memory.

2. The extended memory card according to claim 1, wherein the first notches and the protrusions are provided for electric connection with ground, power, and data.

3. The extended memory card according to claim 1, wherein the reduced size memory card is an RS-MMC card.

4. The extended memory card according to claim 3, wherein the standard memory card is an MMC card.

5. The extended memory card according to claim 4, wherein the extended memory card and the reduced size memory card each uses a communication protocol the same as the communication protocol of an MMC card.

6. The extended memory card according to claim 1, wherein the card reader is deposited in a portable electrical device.

* * * * *